United States Patent Office 3,658,735
Patented Apr. 25, 1972

3,658,735
SOLUTION OF A GRAFT COPOLYMER OF CELLULOSE
Osakazu Nakao, Saburo Nakagawa, Juichi Hirose, Shigeyuki Yamazaki, Takashi Amano, Toshio Nakamura, and Hiroyuki Yamamoto, Shizuoka Prefecture, Japan, assignors to Tomoegawa Paper Manufacturing Company Limited, Chuo-ku, Tokyo, Japan
No Drawing. Filed June 11, 1969, Ser. No. 832,453
Claims priority, application Japan, June 14, 1968, 43/41,075
Int. Cl. C08c 21/32
U.S. Cl. 260—17.4 GC
2 Claims

ABSTRACT OF THE DISCLOSURE

The present invention is directed to a solution of a graft copolymer of cellulose comprising either (1) a polar organic solvent or a mixed solvent containing a polar organic solvent, sulfurous anhydride, an amine and a graft copolymer of cellulose or (2) liquid sulfurous anhydride, an amine and a graft copolymer of cellulose. Such solution is capable of dissolving cellulose and various kinds of polymers.

---

The present invention relates to a solution of a graft copolymer of cellulose.

Graft copolymers of cellulose often have the properties of both cellulose and a synthetic high molecular compound. Therefore, various kinds of graft copolymers of cellulose are synthesized and they attract much interest in industry.

Many proposals have been made regarding the utilization of graft copolymers of cellulose; however, the industrialization thereof is very minute. One of the reasons for the lack of use of such copolymers is that they possess poor molding properties and another has been the previous lack of solvents suitable for dissolved graft copolymers of cellulose.

For example, when attempts were made to use fibers comprising a styrene and methyl methacrylate graft copolymer of celulose in a base stock of a resin impregnated laminate, the resistance of such fibers to heating increased with an increase in the degree of grafting and an unsatisfactory paper was produced.

Further, graft copolymers of cellulose are characterized by poor thermoplastic flow properties and it is difficult to produce a uniform laminate therefrom, for use in making paper, even by treatment with a hot press. In the fiber industry, graft copolymers of acrylonitrile and styrene and the cellulose in cotton and viscose fibers have been produced, but there is a tendency for the grafted polymer to coat the surface of the fiber and reduce its moisture absorption characteristics and affinity for dye.

An object of the present invention is to provide a solution of a graft copolymer of cellulose whereby to facilitate production of films, fibers, non woven fabrics, coating solutions, fibrids, adhesives, molding products and the like.

A solution of a graft copolymer of cellulose according to the present invention comprises either (1) a polar organic solvent or a mixed solvent containing a polar organic solvent, sulfurous anhydride, an amine and a graft copolymer of cellulose or (2) liquid sulfurous anhydride, an amine and a graft copolymer of cellulose.

The term, polar organic solvent as used herein is intended to embrace any solvent for graft copolymers of cellulose other than alcohols, thioalcohols, ketones, nitroparaffins, esters, and ethers.

We have previously discovered various methods for dissolving cellulose in an organic solvent. Accordingly, cellulose solutions comprising various kinds of organic solvents and an amine-$SO_2$ complex have been produced. It has also been found by the present inventors that among the organic solvents useful in connection with an amine-$SO_2$ complex for dissolving cellulose, those capable of dissolving grafted polymers generally are preferred for forming solutions of graft copolymers of cellulose in accord with the present invention. We have also found that solutions comprising a polar organic solvent other than an alcohol, thioalcohol, ketone, nitroparaffin, ester or ether, and a complex of amine-$SO_2$ are suitable for dissolving graft copolymers of cellulose.

Of the various solvents capable of dissolving grafted polymers generally the following are capable of dissolving graft copolymers of cellulose when combined with an amine-$SO_2$ complex.

Amides:
    Formamide, N - methylformamide, N,N - dimethylformamide, acetamide, N-methylacetamide, N,N-dimethylacetamide, propionamide, N - methylpropionamide, N-methylbutyroamide, formanilide.

Sulfoxides:
    Dimethylsulfoxide, diethylsulfoxide, di-n-propylsulfoxide, di-n-butylsulfoxide.

Nitriles:
    Acetonitrile, propionitrile, n-butyronitrile, benzonitrile, phenylacetonitrile, chloroacetonitrile, adiponitrile.

Nitro compound:
    Nitrobenzene.

Halogenated hydrocarbons:
    Methylene chloride, chlorobromomethane, methylene bromide, chloroform, 1,1-dichloroethane, 1,2-dichloroethane, 1-chloro - 2 - bromoethane, 1,1,2-trichloroethane, 1,1,1-trichloroethane, 1,1,2,2-tetrachloroethane, 1,2-dichloropropane, 1,3 - dichloropropane, 1,2,3-trichloropropane, cis-1,2-dichloroethylene.

Lactones:
    butyrolactone, γ-valerolactone, γ-caprolactone, γ-caprylolactone, δ-valerolactone, δ-caprolactone.

Lactams:
    γ-butyrolactam, γ-valerolactam, δ-valerolactam, ε-caprolactam.

Thiocyanates:
    Methyl thiocyanate, ethyl thiocyanate, n-propyl thiocyanate, n-butyl thiocyanate.

Carbonates:
    ethylene carbonate, propylene carbonate.

Carbamates:
    Methyl carbamate, ethyl carbamate, n-propyl carbamate, n-butyl carbamate, ethyl N-methyl carbamate, ethyl N-ethtyl carbamate.

Inorganic solvent:
    Liquid sulfurous anhydride.

In addition, there are a number of liquids which are not very good solvents for graft copolymers of cellulose when used alone, but which can be mixed with one of the above solvents to produce a solvent for graft copolymers of cellulose.

Several examples of such liquids commonly used in industry are benzene, toluene, xylene, trichlorethylene, ethyl acetate, cyclohexane, dioxane and the like.

Further, it may be desirable to utilize a mixture of two or more solvents, even though each is capable of dissolving a graft copolymer of cellulose alone.

The present invention is directed broadly to the concept of dissolving graft copolymers comprising a cellulose backbone to which is grafted or attached, polymeric side chains which are normally soluble in polar solvents other than alcohols, ketones, nitroparaffins, esters and ethers. Examples of monomers suitable for forming such side chains are: methacrylates such as methyl methacrylate, ethyl methacrylate, n-propyl methacrylate, iso-propyl methacrylate, n-butyl methacrylate and iso-butyl methacrylate; and acrylates such as methyl acrylate, ethyl acrylate, n-propyl acrylate, iso-propyl acrylate, n-butyl acrylate, iso-butyl acrylate. Other monomeric and co-monomeric systems useful in connection with this invention for forming graft copolymers of cellulose are acrylonitrile, styrene, vinyl acetate, vinyl chloride, vinylidene chloride, acrylic acid, methacrylic acid, acrylamide, butadiene, butadiene - styrene, butadiene-acrylonitrile, acrylonitrile-styrene, methyl methacrylate-styrene, and methyl methacrylate-acrylonitrile. Accordingly, it is possible to develop the commercial use of a great number of kinds of graft copolymers of cellulose.

For example, the present invention has resulted in the successful production of fibers and fibrid from a solution of a graft copolymer formed by grafting acrylonitrile onto cellulose. Also, transparent films obtained from a soltuion of an ethyl acrylate-cellulose graft copolymer is tough and since polymerized ethyl acrylate is a plasticizer, the addition of a plasticizer is not required. Accordingly, aging does not significantly affect the properties of such a film and it is therefore suitable for use as a packaging material.

The present invention is also directed to the concept of producing a mixed solution comprising a graft copolymer of cellulose with a second material such as a different kind of graft copolymer of cellulose, a synthetic high molecular weight compound, cellulose, a cellulose derivative, or a natural high molecular weight compound other than cellulose and forming a film, a fiber or a non-woven fabric from said mixed solution.

It may, of course, be also possible to form a suspension of an inorganic or organic pigment, filler or finely divided, insoluble polymer in a solution of a graft copolymer of cellulose formed according to the present invention.

We have also previously discovered a method for producing mixed solutions of cellulose and various kinds of high molecular weight compounds and application Serial No. 781,612 covering such method has been filed on Dec. 5, 1968. However, there are certain limitations in the mixing ratios of cellulose and the high molecular weight compound and there are also certain difficulties which have arisen in connection with miscibility of these materials. However, the miscibility between cellulose and various kinds of high molecular weight compounds is remarkably improved by adding a suitably selected graft copolymer of cellulose to the system.

There are many solvents useful in connection with the present invention including both pure and mixed solvent systems. Thus, many alternative selections are available in accordance with the invention for solving secondary problems created by the kind of high molecular weight compound utilized, the stability of the solution and the method used for bringing the graft copolymer out of solution during formation of a product as well as for lowering the cost.

The process for making a solution of a graft copolymer of cellulose according to the present invention is as follows:

Production of a solution of a graft copolymer of cellulose is achieved by the steps of mixing a graft copolymer of cellulose, sulfurous anhydride, and an amine with one of the above-mentioned solvents and allowing the mixture to stand or by stirring the same. The amounts of amine and sulfurous anhydride utilized may generally be varied according to the kind of graft copolymer of cellulose used, the solvent and the water content of the solvent.

Depending on the kind of graft copolymer of cellulose used or the solvent used, the graft copolymer of cellulose may be dissolved immediately or perhaps dissolution will not occur until a few, and possibly as many as ten hours have elapsed after adding the sulfurous anhydride and amine. Furthermore, while many of the solvents can dissolve the graft copolymer of cellulose at ordinary temperatures, there are other solvents which need to be heated to approximately 40 to 50° C. to dissolve the cellulose copolymer. Generally speaking, in those solvents which need to be heated, precipitation of the graft copolymer of cellulose will usually not occur even when the solution is cooled back to room temperature after the graft copolymer of cellulose has been dissolved.

Typical amines preferred in accordance with the invention are aliphatic primary, secondary and tertiary amines and alicyclic secondary amines. It may also be possible to use diamines and triamines. A stable, transparent and uniform solution can be easily achieved by the use of isobutylamine, diethylamine, triethylamine and piperidine.

Graft copolymers of cellulose may usually be dissolved in n-butylamine and n-propylamine, however, the solutions so obtained are often unstable and tend to gel gradually.

Sources of cellulose for the graft copolymer of cellulose include chemical wood pulp, cotton, cotton linter, depolymerized cellulose, reproduced cellulose, and cellulose derivatives, having a low substitution degree.

The solutions obtained in accordance with the invention are generally colorless or yellowish brown. A graft copolymer of cellulose may be successfully brought out of a solution thereof by dilution of the solvent with a nonsolvent, such as, for example, methanol and water, or by evaporation of the solvent by means of reduced pressure or heating.

The following specific examples are intended to set forth the nature of the invention but without limiting the scope thereof to the examples themselves. The amounts of graft copolymer of cellulose, solvent, amine and sulfurous anhydride listed in the examples are in terms of weight and the degree of grafting is calculated from the following equation:

$$\text{Degree of grafting} = \frac{\text{weight of the grafted polymer}}{\text{weight of cellulose backbone}} \times 100\%$$

EXAMPLE 1

2 parts of a methyl methacrylate-graft copolymer of cellulose (degree of grafting=about 30%) produced by graft polymerizing methyl methacrylate onto cellulose derived by dissolving a sulfite pulp having a polymerization degree of about 1000, in the presence of a cerium salt catalyst, were dispersed into 100 parts of various kinds of solvents, each containing 5 parts of diethylamine.

5 parts of gaseous sulfurous anhydride were introduced thereinto.

Some of the solvents used were capable of dissolving the methyl methacrylate-graft copolymer of cellulose rapidly while with one solvent the completion of the dissolution process required approximately 10 hours.

The solvents used in this example for dissolving the graft copolymer of cellulose were N,N-dimethylformamide, N,N-dimethylacetamide, acetonitrile, propionitrile, n-butyronitrile, phenylacetonitrile, nitrobenzene, ethylene carbonate, propylene carbonate, γ-butyrolactone, γ-valerolactone, methylene chloride, ethylene chloride, methyl thiocyanate, n-propyl thiocyanate, γ-caprolactone, and liquid sulfurous anhydride.

EXAMPLE 2

An ethyl methacrylate-graft copolymer of cellulose (degree of grafting=180%) produced by polymerizing ethyl methacrylate in the presence of a catalyst, was dissolved, in the same way as Example 1, in various kinds of solvents. The solvents used to dissolve the graft copolymer of cellulose were acetonitrile, propionitrile, chloroacetonitrile, ethylene chloride, chloroform, methylene bromide, cis-dichloroethylene, formamide, propylene carbonate, N,N-dimethylformamide, N,N-dimethylacetamide, nitrobenzene, γ-butyrolactone, δ-caprolactone, γ-caprylolactone, γ-butyrolactam, chlorobromomethane, n-butyl thiocyanate, ethyl thiocyanate, and liquid sulfurous anhydride.

EXAMPLE 3

A methyl acrylate-graft copolymer of cellulose (degree of grafting=40%) produced by polymerization in the presence of a cerium salt catalyst was dissolved in various kinds of solvents in the same way as in Example 1 and the solvents used to dissolve the graft copolymer of cellulose were sulfoxide, diethyl sulfoxide, acetonitrile, chloroform, methylene chloride, ethylene chloride, 1,1,2-trichloroethane, 1-chloro-2-bromoethane, 1,3-dichloropropane, ethylene carbonate, methyl carbamate, n-propyl carbamate, γ-butyrolactone, δ-valerolactam, and liquid sulfurous anhyride.

EXAMPLE 4

An ethyl acrylate graft copolymer of cellulose (degree of grafting=129%) produced by polymerization in the presence of a cerium salt catalyst, was dissolved in various kinds of solvents in the same way as in Example 1 and the solvents used to dissolve the graft copolymer of cellulose were dimethyl sulfoxide, diethyl sulfoxide, di n-propyl sulfoxide, di n-butyl sulfoxide, formamide, acetonitrile, methylene chloride, ethylene chloride, chloroform, 1,2-dichloropropane, 1,2,3-trichloropropane, ethylene carbonate, propylene carbonate, γ-butyrolactam, ε-caprolactam, n-propyl carbamate, ethyl N-ethyl carbamate, δ-valerolactam, liquid sulfurous acid anhydride.

EXAMPLE 5

An acrylonitrile graft copolymer of cellulose produced by polymerization (degree of grafting=86%) in the presence of a cerium salt catalyst was dissolved in various kinds of solvents in the same way as in Example 1, and the solvents used to dissolve the graft copolymer of cellulose were dimethyl sulfoxide, ethylene carbonate, γ-butyrolactone, N,N-dimethylformamide, and N,N-dimethylacetamide.

EXAMPLE 6

An acrylamide graft copolymer of cellulose (degree of grafting=12%) produced by polymerization in the presence of a cerium salt catalyst was dissolved in various kinds of solvents in the same way as in Example 1 and the solvents used to dissolve the graft copolymer of cellulose were formamide, and γ-butyrolactam.

EXAMPLE 7

An n-butyl methacrylate graft copolymer of cellulose (degree of grafting=90%) produced by polymerization in the presence of a cerium salt catalyst was dissolved in various kinds of solvents in the same way as in Example 1 and the solvents used to dissolve the graft copolymer of cellulose were N,N-dimethylformamide, N,N-dimethylacetamide, ethylene chloride, ethylene carbonate, and liquid sulfurous anhydride.

EXAMPLE 8

An n-butyl acrylate graft copolymer of cellulose (degree of grafting=150%) produced by polymerization in the presence of a cerium salt catalyst was dissolved in various kinds of solvents in the same way as in Example 1 and the solvents used to dissolve the graft copolymer of cellulose were N,N-dimethylformamide, N,N-dimethylacetamide, acetonitrile, methylene chloride, γ-butyrolactone, and liquid sulfurous anhydride.

EXAMPLE 9

A methacrylate graft copolymer of cellulose (degree of grafting=18%) produced by polymerizing methacrylic acid onto a cellulose pretreated with hydrogen peroxide in the presence of a ferrous sulfate catalyst was dissolved in various kinds of solvents in the same way as in Example 1. The solvents used to dissolve the graft copolymer of cellulose were formamide, N,N-dimethylformamide, N-methylacetamide, acetamide, propionamide, and ethylene carbonate.

EXAMPLE 10

An acrylate graft copolymer of cellulose (degree of grafting=50%) produced by polymerizing acrylic acid onto a cellulose pretreated with hydrogen peroxide in the presence of a ferrous sulfate catalyst was dissolved in various kinds of solvents in the same way as in Example 1. The solvents used to dissolve the graft copolymer of cellulose were formamide, N-methylformamide, acetamide, propionamide, and ethylene carbonate.

EXAMPLE 11

A vinyl acetate graft copolymer of cellulose (degree of grafting=79%) produced by polymerization in the presence of a cerium salt catalyst was dissolved in various kinds of solvents in the same way as in Example 1 and the solvents used to dissolve the graft copolymer of cellulose were dimethyl sulfoxide, acetonitrile, propylene carbonate, methylene chloride, ethylene chloride, formamide, benzonitrile, nitrobenzene, N,N-dimethylformamide, N,N-dimethylacetamide, formanilide, γ-butyrolactone, γ-caprolactone, γ-caprolactam, n-butyl carbamate, ethyl N-methyl carbamate, ethyl N-ethyl carbamate, ethyl carbamate, and liquid sulfurous anhydride.

EXAMPLE 12

A styrene graft copolymer of cellulose (degree of grafting=63%) produced by using a cerium salt catalyst was dissolved in various kinds of solvents in the same way as in Example 1.

The solvents used to dissolve the graft copolymer of cellulose were methylene chloride, ethylene chloride, chloroform, benzonitrile, tetrachloroethane, methyl thiocyanate, nitrobenzene, and butyrolactone.

EXAMPLE 13

A methyl methacrylate-acrylonitrile graft copolymer of cellulose (degree of grafting=93%, methyl methacrylate:acrylonitrile=1:4) produced by using a cerium salt catalyst was dissolved in various kinds of solvents in the same way as in Example 1.

The solvents used to dissolve the graft copolymer of cellulose were dimethyl sulfoxide, ethylene carbonate, N,N-dimethylformamide, N,N-dimethylacetamide, γ-butyrolactone, and γ-valerolactone.

EXAMPLE 14

A methyl methacrylate-styrene graft copolymer of cellulose (degree of grafting=120%, methyl methacrylate:styrene=4:1) produced by using a cerium salt catalyst was dissolved in various kinds of solvents in the same way as in Example 1 and the solvents used to dissolve the graft copolymer of cellulose were dimethyl sulfoxide, N,N-dimethylacetamide, acetonitrile, propylene carbonate, methylene chloride, ethylene chloride, nitrobenzene, and γ-butyrolactone.

EXAMPLE 15

An acrylonitrile-styrene graft copolymer of cellulose (degree of grafting=84%, acrylonitrile:styrene=1:3) produced by using a cerium salt catalyst was dissolved in various kinds of solvents in the same way as in Example 1 and the solvents used to dissolve the graft copolymer of cellulose were N,N-dimethylformamide, dimethyl sulfoxide, and γ-butyrolactone.

EXAMPLE 16

A butadiene graft copolymer of cellulose (degree of grafting=63%) prepared by a simultaneous grafting technique using a cobalt 60 gamma ray was dissolved in various kinds of solvents in the same way as in Example 1. The solvents used to dissolve the graft copolymer of cellulose were methylene chloride, ethylene chloride, chloroform, and nitrobenzene.

EXAMPLE 17

A butadiene-styrene graft copolymer of cellulose (degree of grafting=125%, butadiene:styrene=15.85) prepared by a simultaneous grafting technique using a cobalt 60 gamma ray was dissolved in various kinds of solvents in the same way as in Example 1. The solvents used to dissolve the graft copolymer of cellulose were methylene chloride, ethylene chloride, chloroform, and nitrobenzene.

EXAMPLE 18

A butadiene-acrylonitrile graft copolymer of cellulose (degree of grafting=185%, butadiene:acrylonitrile=1:1) prepared by a simultaneous grafting technique using a cobalt 60 gamma ray was dissolved in various kinds of solvents in the same way as in Example 1. The solvents used to dissolve the graft copolymer of cellulose were methylene chloride, ethylene chloride, chloroform, nitrobenzene, γ-butyrolactone, dimethyl sulfoxide.

EXAMPLE 19

It was discovered during the experimentation upon which Examples 1 to 18 were based that graft copolymers of cellulose cannot generally be dissolved in a solvent comprising toluene, benzene, carbon tetrachloride, trichloroethylene, ethyl acetate or an amine, and sulfurous anhydride.

However, these solvents were found to be capable of dissolving a graft copolymer of cellulose when used in combination with a polar solvent in which graft copolymers of cellulose are soluble.

The following table serves to illustrate various mixed solvents capable of dissolving graft copolymers of cellulose.

TABLE 1

| Kind of grafted copolymer of cellulose | Combination in the mixed solvent | Mixing ratio |
|---|---|---|
| Polystyrene | Methylene chloride+toluene | 3:1 |
| Do | Methylene chloride+benzene | 1:1 |
| Do | Methylene chloride+carbon tetrachloride | 2:1 |
| Polyethyl methacrylate | Dimethyl sulfoxide+trichloroethylene | 3:2 |
| Do | Dimethyl sulfoxide+ethyl acetate | 3:2 |
| Do | Dimethyl sulfoxide+toluene | 3:1 |
| Do | Dimethyl sulfoxide+benzene | 3:1 |
| Polymethyl acrylate | Ethylene chloride+toluene | 3:1 |
| Do | Ethylene chloride+benzene | 3:1 |
| Do | Ethylene chloride+carbon tetrachloride | 3:1 |
| Polyvinyl acetate | Ethylene carbonate+trichloroethylene | 1:1 |
| Do | γ-Butyrolactone+trichloroethylene | 3:1 |
| Do | Dimethyl sulfoxide+toluene | 3:1 |
| Do | Dimethyl sulfoxide+benzene | 3:1 |

EXAMPLE 20

1 part each of a polymethyl methacrylate, a dissolved sulfite pulp and a methyl methacrylate graft copolymer of cellulose (degree of grafting=30%) were soaked in 100 parts of methylene chloride containing 5 parts of diethylamine. After about 10 minutes, 5 parts of gaseous sulfurous anhydride were introduced and the mixture was allowed to stand. After about 10 hours, each of the polymers was completely dissolved to present a transparent and uniform mixed solution.

EXAMPLE 21

In accordance with Example 1, an acrylonitrile graft copolymer of cellulose (degree of grafting=86%) was made into a 2% solution thereof by using dimethyl sulfoxide as the solvent. The solution was mixed with dimethyl sulfoxide solution containing 2% polyacrylonitrile.

The solutions provided a uniform mixed solution over the entire range of mixing ratios. A 1:1 mixed solution was then extruded into methanol by means of an injection nozzle, whereupon the solution coagulated and produced a fine fiber.

EXAMPLE 22

In accordance with Example 1, a styrene graft copolymer of cellulose (degree of grafting=63%) and an acrylonitrile graft copolymer of cellulose (degree of grafting=86%) were each made into a 2% solution thereof using γ-butyrolactone as the solvent. The solutions provided a uniform mixed solution over the entire range of mixing ratios.

EXAMPLE 23

In accordance with Example 1, a 2% solution of a vinyl acetate graft copolymer of cellulose (degree of grafting=79%) was made using methylene chloride as the solvent.

This solution and a methylene chloride solution containing 2% of polyvinyl chloride were mixed in a ratio of 7:3 to produce a uniform and transparent solution. The solution was cast onto a glass plate, dried at a temperature of 40° C. and thereafter soaked in water. A transparent and uniform film was obtained.

EXAMPLE 24

In accordance with Example 1, a 2% solution of an ethyl acrylate graft copolymer of cellulose (degree of grafting=129%) was made using ethylene chloride as the solvent.

The solution was cast onto a glass plate and then soaked in water. After coagulation and drying a transparent and soft film was produced.

The film had a tensile strength of 11 kg./mm.$^2$ and an elongation of 13%. The film was different from cellophane in that it did not contain additives such as glycerol and, therefore, was very suitable for use as a packaging material since it had very little change after aging.

In the present invention, it is apparent that many kinds of graft copolymers of cellulose and polar solvents may be used. Also, various combinations of mixed solvents are possible within the scope of the invention which are not limited to the specific examples themselves.

What is claimed is:

1. A solution of graft copolymer of cellulose comprising (1) a graft copolymer of cellulose with at least one member selected from the group consisting of methacrylic acid esters of lower alkyl alcohols, acrylic acid esters of lower alkyl alcohols, acrylonitrile, acrylamide, acrylic acid, vinyl acetate, styrene, and butadiene, (2) at least one polar organic solvent free of alcohol, thioalcohol, ketone, nitroparaffin, ether and ester groups, (3) sulfurous anhydride, and (4), as an additional component, at least one amine selected from the group consisting of primary, secondary and tertiary aliphatic amines, and alicyclic secondary amines.

2. A solution of a graft copolymer of cellulose as claimed in claim 1 wherein said secondary aliphatic amines are selected from the group consisting of dimethyl amine and diethyl amine, said tertiary aliphatic amines are selected from the group consisting of trimethyl amine and triethyl amine, said alicyclic secondary amines are selected from the group consisting of piperidine and pyrrolidine and said aliphatic primary amines containing secondary and tertiary alkyl groups are selected from the group consisting of iso-butyl amine, secondary butyl amine, and tertiary butyl amine.

References Cited
UNITED STATES PATENTS

| | | | |
|---|---|---|---|
| 2,868,744 | 1/1959 | White et al. | 260—17.4 CL |
| 2,908,659 | 10/1959 | Shashousa | 260—17.4 CL |
| 3,121,698 | 2/1964 | Orsino et al. | 260—17 A |
| 3,232,823 | 2/1966 | Sobolev | 260—17.4 GC |
| 3,372,132 | 3/1968 | Cruz | 260—17.4 GC |
| 3,405,081 | 10/1968 | Hata et al. | 260—17.4 CL |

WILLIAM H. SHORT, Primary Examiner

L. M. PHYNES, Assistant Examiner

U.S. Cl. X.R.

117—56; 204—159.12; 260—17 A, 32.6 A, 32.6 PQ; 264—182, 184